United States Patent
Nias et al.

(10) Patent No.: US 9,224,409 B2
(45) Date of Patent: Dec. 29, 2015

(54) TOLERANCE RING WITH GROUPED WAVES

(71) Applicants: Benjamin Nias, Bristol (GB); Simon Alan Hughes, Haverfordwest (GB); Andrew Robert Slayne, Frampton Cotterell (GB)

(72) Inventors: Benjamin Nias, Bristol (GB); Simon Alan Hughes, Haverfordwest (GB); Andrew Robert Slayne, Frampton Cotterell (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 212 days.

(21) Appl. No.: 13/874,440

(22) Filed: Apr. 30, 2013

(65) Prior Publication Data

US 2013/0315664 A1 Nov. 28, 2013

Related U.S. Application Data

(60) Provisional application No. 61/640,617, filed on Apr. 30, 2012.

(51) Int. Cl.
*F16D 1/08* (2006.01)
*G11B 5/48* (2006.01)
(Continued)

(52) U.S. Cl.
CPC .............. *G11B 5/4813* (2013.01); *F16C 27/02* (2013.01); *F16D 1/0835* (2013.01); *G11B 5/5569* (2013.01); *F16C 2240/30* (2013.01); *F16C 2370/12* (2013.01); *Y10T 403/7047* (2015.01)

(58) Field of Classification Search
CPC ...... F16C 232/24; F16C 27/02; F16C 35/073; F16C 35/077; F16C 2370/126; B62D 1/16; F16D 1/0835; G11B 5/4813; G11B 5/5569; Y10T 403/7047

USPC .......... 403/365, 367, 371, 372; 411/520, 521; 360/97.02, 265.2, 265.6, 266.1
See application file for complete search history.

(56) References Cited

U.S. PATENT DOCUMENTS 3,700,271 A * 10/1972 Blaurock et al. .............. 403/372
4,764,095 A    8/1988 Fickelscher
(Continued)

FOREIGN PATENT DOCUMENTS

CA    1111354    10/1981
CA    1320978 C   8/1993
(Continued)

OTHER PUBLICATIONS

International Search Report from PCT Application No. PCT/GB2013/051115, dated Jul. 4, 2013, 1 pg.
(Continued)

*Primary Examiner* — Gregory Binda
*Assistant Examiner* — Nahid Amiri
(74) *Attorney, Agent, or Firm* — Abel Law Group, LLP; Chi Suk Kim

(57) ABSTRACT

A tolerance ring can include a generally cylindrical body having a sidewall. The sidewall can include a first unformed section and a gap in the first unformed section. The gap can extend along an entire length of the body to establish a split in the body. The sidewall can also include a second unformed section opposite the first unformed section, a first wave bank flanking the first unformed section with the gap, and a second wave bank flanking the first unformed section with the gap. The wave banks can be equally spaced around a circumference of the body of the tolerance ring and the body of the tolerance ring can be symmetrical about a center axis that extends from a center of the tolerance ring and bisects the gap in the first unformed section.

20 Claims, 11 Drawing Sheets

(51) Int. Cl.
*G11B 5/55* (2006.01)
*F16C 27/02* (2006.01)

(56) References Cited

U.S. PATENT DOCUMENTS

| | | | |
|---|---|---|---|
| 4,767,276 A | 8/1988 | Barnes et al. | |
| 4,790,683 A | 12/1988 | Cramer, Jr. et al. | |
| 4,981,390 A | 1/1991 | Cramer, Jr. et al. | |
| 5,059,042 A | 10/1991 | Grierson | |
| 5,125,755 A | 6/1992 | Adler et al. | |
| 5,509,667 A | 4/1996 | Klein et al. | |
| 5,839,835 A | 11/1998 | Zernickel et al. | |
| 6,333,839 B1 * | 12/2001 | Misso et al. | 360/265.7 |
| 6,480,363 B1 | 11/2002 | Prater | |
| 6,883,836 B2 | 4/2005 | Breay et al. | |
| 7,007,386 B1 | 3/2006 | Stover | |
| 7,343,989 B2 | 3/2008 | Underwood | |
| 7,554,771 B2 * | 6/2009 | Hanrahan et al. | 360/265.2 |
| 7,580,225 B2 * | 8/2009 | Hanrahan et al. | 360/265.6 |
| 7,583,476 B2 | 9/2009 | Hanrahan et al. | |
| 7,611,303 B2 * | 11/2009 | Hanrahan et al. | 403/372 |
| 7,670,079 B2 | 3/2010 | Snadden et al. | |
| 7,811,175 B2 | 10/2010 | Schneider et al. | |
| 7,850,389 B2 * | 12/2010 | Hanrahan et al. | 403/372 |
| 7,909,369 B2 | 3/2011 | Kertesz et al. | |
| 7,922,418 B2 * | 4/2011 | Baker et al. | 403/372 |
| 7,957,103 B2 * | 6/2011 | Woodhead et al. | 360/265.2 |
| 7,958,637 B2 * | 6/2011 | Hughes | 29/895 |
| 7,978,437 B2 * | 7/2011 | Hanrahan et al. | 360/265.6 |
| 2004/0076356 A1 | 4/2004 | Kapaan et al. | |
| 2009/0042657 A1 | 2/2009 | Schneider et al. | |
| 2010/0003076 A1 | 1/2010 | Slayne | |
| 2010/0073820 A1 | 3/2010 | Slayne et al. | |
| 2010/0143075 A1 | 6/2010 | Disser | |
| 2011/0076096 A1 | 3/2011 | Slayne et al. | |
| 2011/0085752 A1 | 4/2011 | Tecza et al. | |
| 2011/0150375 A1 | 6/2011 | Jaeger et al. | |
| 2011/0150377 A1 | 6/2011 | Hartmann | |
| 2011/0176757 A1 | 7/2011 | Heldmann et al. | |
| 2011/0247891 A1 | 10/2011 | Meyer et al. | |
| 2011/0309611 A1 | 12/2011 | Smith | |
| 2012/0087044 A1 | 4/2012 | Schmidt et al. | |

FOREIGN PATENT DOCUMENTS

| | | |
|---|---|---|
| CA | 2736810 A1 | 3/2010 |
| DE | 19855538 A1 | 12/1998 |
| DE | 102004051396 A1 | 4/2006 |
| DE | 102008028371 A1 | 12/2009 |
| EP | 1184583 A1 | 3/2002 |
| EP | 0687822 B2 | 9/2004 |
| EP | 2054885 B1 | 2/2011 |
| FR | 2627620 A3 | 8/1989 |
| GB | 722068 A | 1/1955 |
| GB | 856486 A | 12/1960 |
| GB | 895787 A | 5/1962 |
| GB | 1120661 A | 7/1968 |
| GB | 1377446 A | 12/1974 |
| GB | 1393529 A | 5/1975 |
| GB | 2198780 A | 6/1987 |
| GB | 2459959 A | 11/2009 |
| JP | 08247359 A | 9/1996 |
| JP | 2005-344745 A | 12/2005 |
| JP | 2011052715 A | 3/2011 |
| JP | 2012-052638 A | 3/2012 |
| RU | 2119443 C1 | 9/1998 |
| WO | 88/07285 | 9/1988 |
| WO | 01/31211 A1 | 5/2001 |
| WO | 2011036126 A1 | 3/2011 |
| WO | 2012/029841 A1 | 3/2012 |
| WO | 2013/164606 A1 | 11/2013 |
| WO | 2014001818 A1 | 1/2014 |

OTHER PUBLICATIONS

International Search Report from PCT Application No. PCT/GB2013/051730, dated Aug. 30, 2013, 1 pg.

* cited by examiner

TOLERANCE RING WITH GROUPED WAVES

This application claims priority to and the benefit of U.S. Provisional Patent Application No. 61/640,617, which was filed on Apr. 30, 2012, and is incorporated herein by reference in its entirety.

BACKGROUND OF THE INVENTION

1. Field of the Disclosure

The present disclosure is directed to tolerance rings, particularly to tolerance rings for actuator arms within hard disk drives.

2. Description of the Related Art

The present disclosure relates to tolerance ring assemblies, wherein a tolerance ring provides an interference fit between parts of an assembly, in which a first part has a cylindrical portion located in a cylindrical bore of a second part. In particular, the present disclosure relates to assemblies having a tolerance ring that provides an interference fit between a cylindrical component such as a shaft or a bearing and a housing for the shaft.

Improved engineering techniques have resulted in the need for greater accuracy of machine parts, raising manufacturing costs. Very close tolerances are required where press fits, splines, pins or keyways are employed to transmit torque in applications such as pulleys, flywheels or driveshafts.

Tolerance rings may be used to provide an interference fit between parts required to transmit torque. Tolerance rings provide a low cost means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions extend radially outwards from the ring, or radially inwards towards the center of the ring. Usually, the protrusions are formations, possibly regular formations, such as corrugations, ridges or waves.

When the ring is located in the annular space between, for example, a shaft and a bore in a housing in which the shaft is located, the protrusions are compressed. Each protrusion acts as a spring and exerts a radial force against the shaft and the surface of the bore, providing an interference fit between the shaft and the housing. Rotation of the housing or the shaft will produce similar rotation in the other of the shaft or the housing, as torque is transmitted by the tolerance ring. Typically, the band of protrusions is axially flanked by annular regions of the ring that have no formations (known in the art as "unformed regions" of the tolerance ring).

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring. The term "shaft" as used hereafter includes any assembly component with a cylindrical portion, such as a shaft or a bearing.

Accordingly, the industry continues to need improvements in tolerance rings, particularly tolerance rings installed within hard disk drives.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to tolerance rings, and particularly, to tolerance rings that can be installed within a hard disk drive between a pivot and a bore formed in an actuator arm. In one aspect, a tolerance ring can be fitted around the pivot and then this pivot ring assembly can be inserted into the bore. Alternatively, the tolerance ring can be inserted into the bore and the pivot can be inserted into the tolerance ring.

In a typical tolerance ring, the waves nearest to the gap tend to be the weakest, i.e., least stiff, since the waves have a gap on one side and material on the other and the remaining waves in the tolerance ring are flanked by material on both sides. This variation in stiffness can cause performance variables, e.g., resonance and alignment, to be very dependent on a position of the gap in the hard disk drive assembly. Attempting to optimize the gap location for one performance parameter can adversely affect other performance parameters. This, in turn, can compromise overall performance.

A tolerance ring according to one or more of the embodiments described herein can include a plurality of waves that are arranged in groups. The groups can be equally spaced around the circumference of the tolerance ring and the tolerance ring can be symmetric about an axis passing through the center of the tolerance ring and a gap in the tolerance ring.

The grouped wave arrangement provided by the tolerance rings disclosed herein can provide a tolerance ring having a resonant frequency and stiffness that do not substantially vary circumferentially around the tolerance ring. As such, the tolerance ring can maintain the post in alignment within the bore and can substantially prevent any rocking of the post within the bore under normal operational loads in nearly any radial direction.

Figure 1:
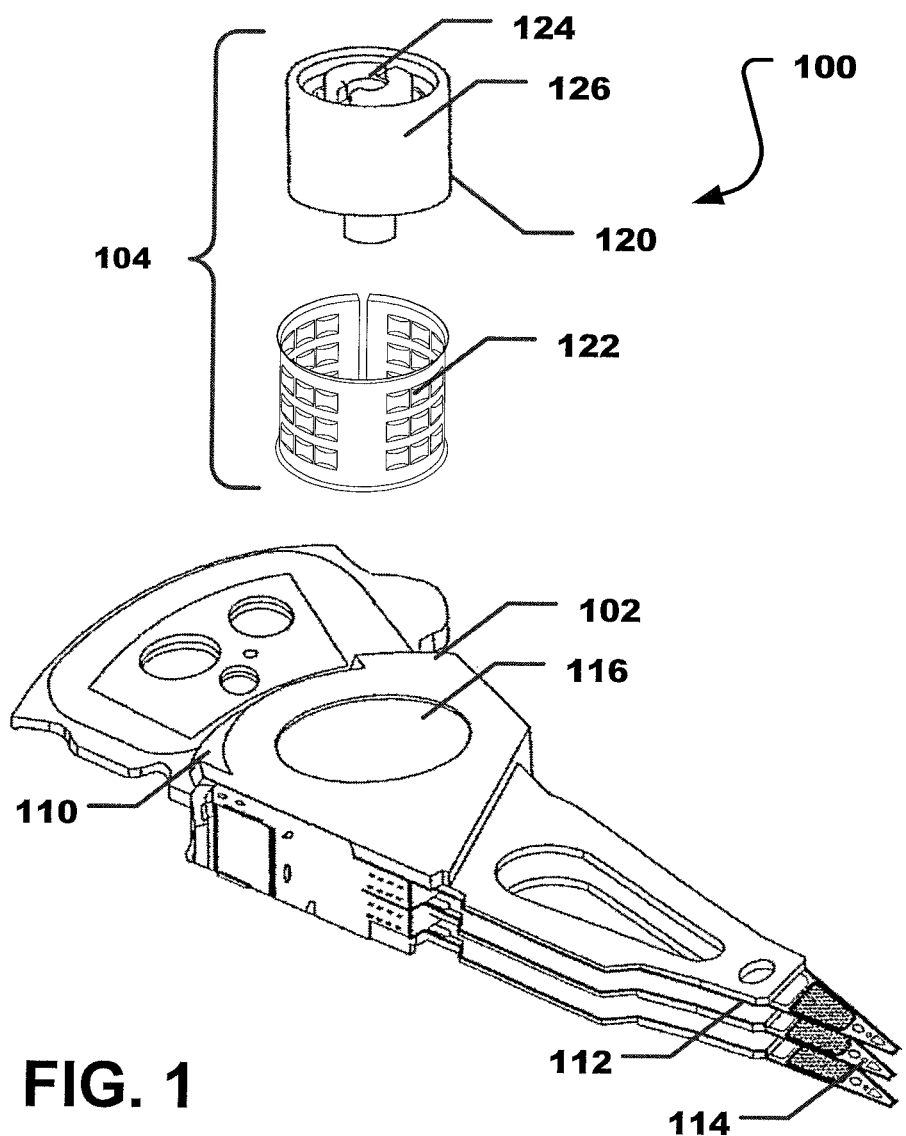
FIG. 1 includes an exploded perspective view of a hard disk drive assembly in accordance with an embodiment.

Referring initially to FIG. 1, a hard disk drive assembly is shown and is generally designated 100. The hard disk drive assembly 100 can include an actuator arm 102 for a hard disk drive and a pivot assembly 104.

As illustrated, the actuator arm 102 can include a proximal end 110 and a distal end 112. A plurality of read/write heads 114 can extend from the distal end 112 of the actuator arm 102. Moreover, the actuator arm 102 can be formed with a bore 116 near the proximal end 110 of the actuator arm 102.

FIG. 1 further indicates that the pivot assembly 104 can include a pivot 120 and a tolerance ring 122. The pivot 120 can include an inner member 124 and an outer member 126 and the outer member 126 can rotate with respect to the inner member 124.

In a particular aspect, the tolerance ring 122 can fit around the pivot 120 and then, the pivot assembly 104 can be installed within the bore 116. In another aspect, the tolerance ring 122 can be placed within the bore 116 and the pivot 120 can be inserted into the tolerance ring 122. The tolerance ring 122 can establish an interference fit between the outer member 126 of the pivot 120 and the bore 116 of the actuator arm 102. As such, the actuator arm 102 can rotate with the outer member 126 of the pivot 120 around the inner member 124 of the pivot 120.

Figure 2:
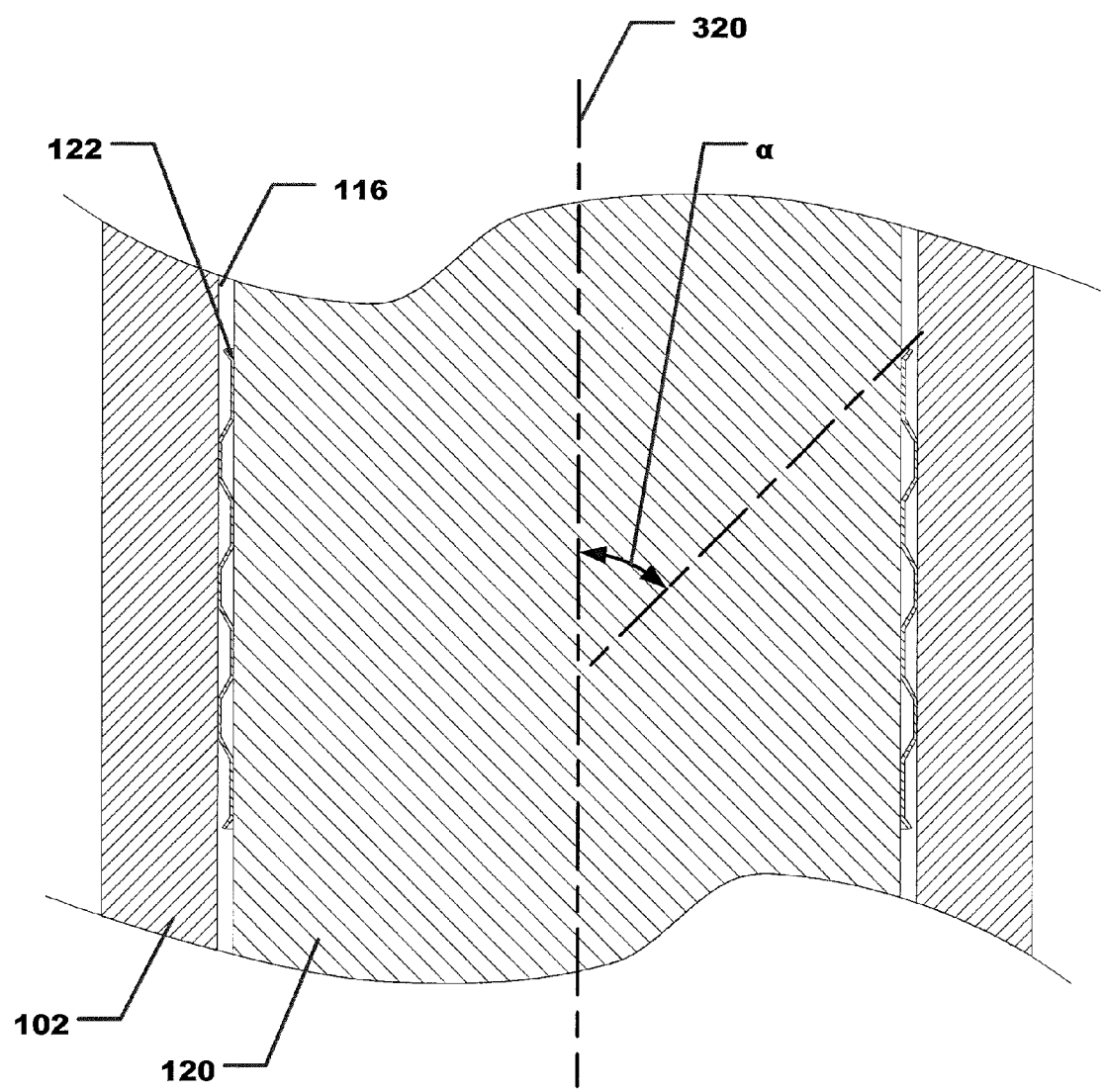
FIG. 2 includes a cross-sectional view of a hard disk drive assembly in accordance with an embodiment.

Accordingly, as shown in FIG. 2, the tolerance ring 122 can be installed within the bore 116 between an outer component, the actuator arm 102, and an inner component, the pivot 120. In a particular aspect, when installed, no portion of the tolerance ring 122 extends beyond the top or bottom of the bore and the tolerance ring 122 can be completely contained within the bore 116. In another aspect, a portion of the tolerance ring 122, e.g., a top, a bottom, a structure on a top, a structure on a bottom, or a combination thereof, can extend from the bore.

As illustrated in FIG. 2, and described in greater detail below, the tolerance ring 122 can be configured to engage the inner wall of the bore 116 and the outer wall of the pivot 120 in order to maintain the pivot 120 within the actuator arm 102 in an interference fit. The tolerance ring 122 can account for dimensional variations by expanding around the pivot 120 as it is installed thereon and then, at least partially deforming, or compressing, within the bore 116 during installation.

Figure 3:
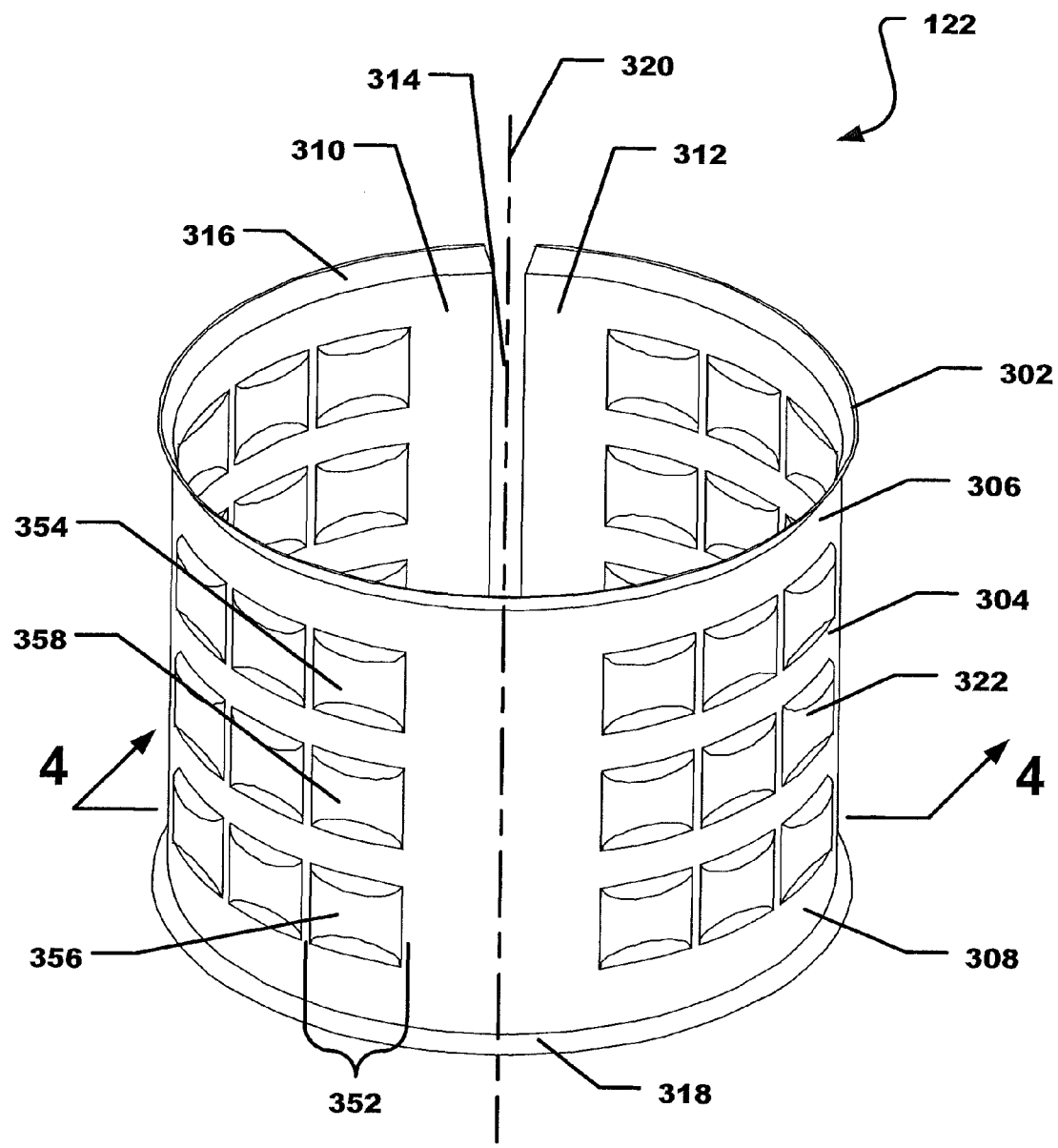
FIG. 3 includes a perspective view of a tolerance ring in accordance with an embodiment.
Figure 4:
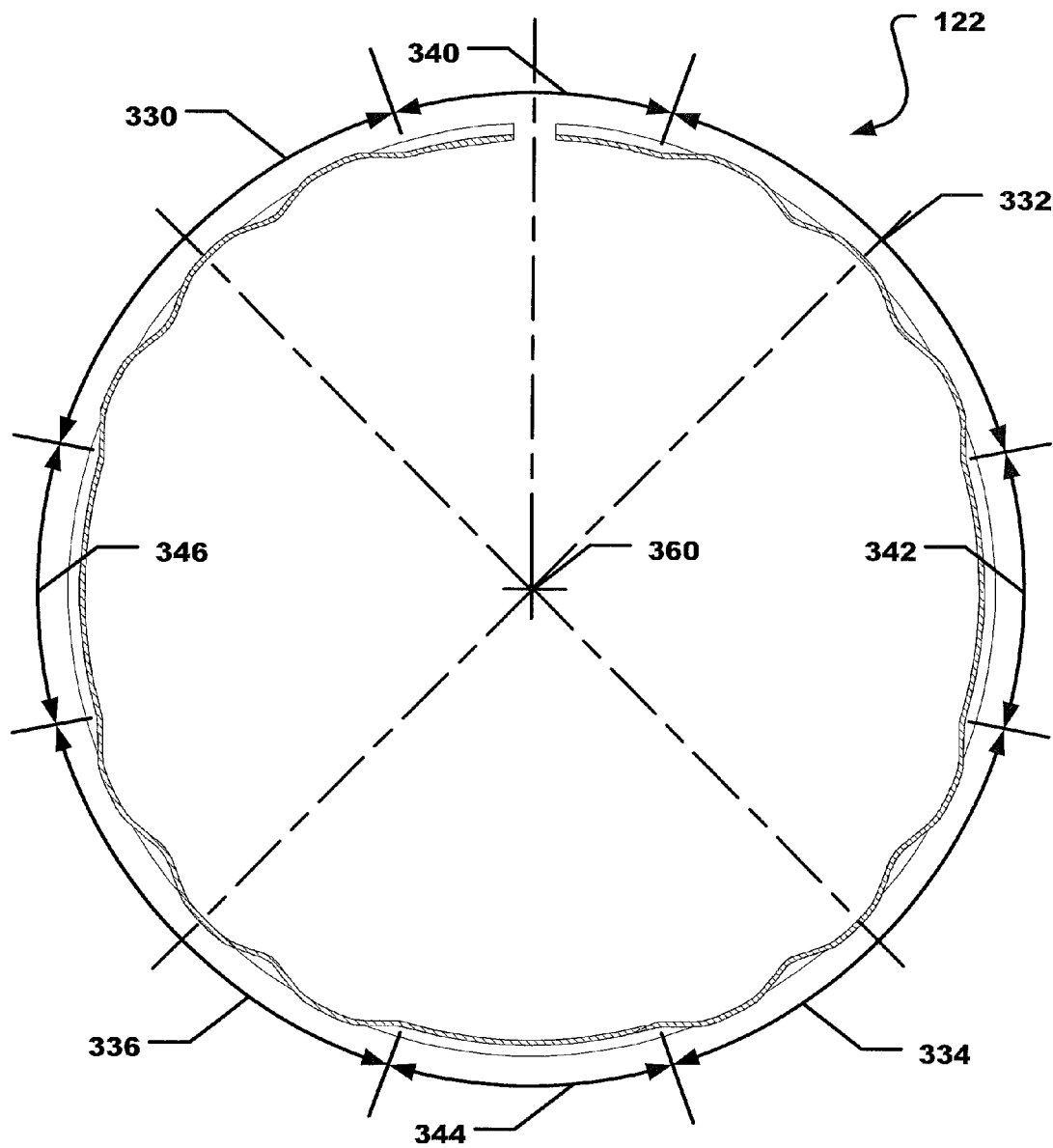
FIG. 4 includes a cross-sectional view of a tolerance ring in accordance with an embodiment taken along Line 4-4 in FIG. 3.

Referring now to FIG. 3 and FIG. 4, details concerning the tolerance ring 122 are illustrated. As depicted, the tolerance ring 122 can include a generally cylindrical body 302 having a generally cylindrical sidewall 304. The sidewall 304 can include a top 306 and a bottom 308. Further, the sidewall 304 can include a first end 310 and a second end 312. Moreover, a gap 314 can be established between the first end 310 and the second end 312 of the sidewall 304. As indicated in FIG. 3, the body 302 of the tolerance ring 122 can further include an upper flange 316 extending from the top 306 of the sidewall 304 and a lower flange 318 extending from the bottom 308 of the sidewall 304.

The tolerance ring 122 can include a central axis 320 and as shown in FIG. 2 and FIG. 3, in a particular aspect, the flanges 316, 318 can be angled in an outward direction with respect to the central axis 320 of the tolerance ring 122. It is to be understood that the flanges 316, 318 can be angled in an inward direction with respect to the central axis 320. In either case, the flanges 316, 318 can form an angle, α, with respect the central axis 320. In a particular aspect, α can be ≥5°, such as ≥10°, or ≥15°. In another aspect, α can be ≤30°, such as ≤25°, or ≤20°. In another aspect, α can be within a range between, and including, any of the values disclosed above.

As more clearly illustrated in FIG. 2, the tolerance ring 122 may include an overall wall thickness, $t_{OW}$, that is the distance between the inner surface of the sidewall 304 of the tolerance ring 122 and an outer surface of a wall structure formed in the sidewall 304 of the tolerance ring 122. Further, each flange 316, 318 can extend from the sidewall 304 such that each flange 316, 318 has an overall flange thickness, $t_{OF}$, that is the distance between the inner surface of the sidewall 304 of the tolerance ring 122 and the outer edge of the flange 316, 318. In a particular aspect, $t_{OF}$ can be ≥30% $t_{OW}$, such as ≥35% $t_{OW}$, ≥40% $t_{OW}$, ≥45% $t_{OW}$, ≥50% $t_{OW}$, ≥55% $t_{OW}$, or ≥60% $t_{OW}$. Further, $t_{OF}$ can be ≤98% $t_{OW}$, such as ≤95% $t_{OW}$, ≤90% $t_{OW}$, ≤85% $t_{OW}$, or ≤80% $t_{OW}$. In another aspect, $t_{OF}$ can be within a range between, and including, any of the percentage values of $t_{OW}$ disclosed above.

In certain embodiments that include flanges and wall structures that extend in an inward direction relative to the central axis 320, $t_{OW}$ is measured between an outer surface of the sidewall 304 of the tolerance ring 122 and an inner surface of a wall structure formed in the sidewall 304 of the tolerance ring 122. Further, in such embodiments, $t_{OF}$ is measured between the outer surface of the sidewall 304 of the tolerance ring 122 and the inner edge of the flange 316, 318.

Still referring to FIG. 2 and FIG. 3, the tolerance ring 122 can include a plurality of waves 322 formed in the sidewall 304 of the body 302. As illustrated, in one aspect, the waves 322 can extend in an outward direction with respect to the central axis 320. However, in another aspect, the waves 322 can extend in an inward direction with respect to the central axis 320.

The waves 322 can be formed, or otherwise arranged, in the sidewall 304 of the body 302 so that the tolerance ring 122 includes a first wave bank 330 located along the circumference of the sidewall 304 of the body 302, a second wave bank 332 located along the circumference of the sidewall 304 of the body 302, a third wave bank 334 located along the circumference of the sidewall 304 of the body 302, and a fourth wave bank 336 located along the circumference of the sidewall 304 of the body 302.

The sidewall 304 can also include a first unformed section 340 that is located circumferentially between the first wave bank 330 and the second wave bank 332. The sidewall 304 can include a second unformed section 342 that is located circumferentially between the second wave bank 332 and the third wave bank 334. The sidewall 304 can also include a third unformed section 344 that is located circumferentially between the third wave bank 334 and the fourth wave bank 336. Further, the sidewall 304 can include a fourth unformed section 346 that is located circumferentially between the fourth wave bank 336 and the first wave bank 330.

Each unformed section 340, 342, 344, 346 comprises a section of the sidewall 304 that extends between adjacent wave banks 330, 332, 334, 336 and is not formed with any waves or other structures. Each unformed section 340, 342, 344, 346 also extends between the upper flange 316 and the lower flange 318 of the body 302 without any additional structure or feature formed between the flanges 316, 318. Any unformed section 340, 342, 344, 346 spans across a first unformed section angle, $A_{U1}$, for 340, a second unformed section angle $A_{U2}$ for 342, a third unformed section angle $A_{U3}$ for 344, and a fourth unformed section angle $A_{U4}$ for 346. $A_{U1}$ through $A_{U4}$ can have the same degree or different and any angle, $A_{U1}$ through $A_{U4}$ can be ≥1°, such as ≥2°, ≥5°, ≥10°, ≥15°, ≥20°, ≥25°, ≥30°, or ≥35°. Any angle, $A_{U1}$ through $A_{U4}$ can be ≤120°, such as ≤90°, ≤75°, ≤60°, ≤45°, or ≤30°. In embodiments, any angle, $A_{U1}$ through $A_{U4}$ can be 90°±3°, 90°±2°, 90°±1°, 90°±0.5°, 90°±0.1°, 60°±3°, 60°±2°, 60°±1°, 60°±0.5°, 60°±0.1°, 45°±3°, 45°±2°, 45°±1°, 45°±0.5°, 45°±0.1°, 30°±3°, 30°±2°, 30°±1°, 30°±0.5°, 30°±0.1°, 20°±3°, 20°±2°, 20°±1°, 20°±0.5°, or 20°±0.1°. In an embodiment, any angle, $A_{U1}$ through $A_{U4}$ can range from 1° to 90°, such as from 15° to 90°, from 30° to 75°, or from 45° to 60°.

As indicated in FIG. 4, the wave banks 330, 332, 334, 336 and the unformed sections 340, 342, 344, 346 alternate around the circumference of the sidewall 304. Moreover, in a particular aspect, the wave banks 330, 332, 334, 336 are evenly spaced around the circumference of the sidewall 304 by the unformed sections 340, 342, 344, 346 of the sidewall 304.

In another aspect, each wave bank 330, 332, 334, 336 can include formed sections along the sidewall 304. The formed sections can include wave structures, such as wave columns, elongated waves, waves or a combination thereof. Further, within each wave bank an unformed section can exist circumferentially, and vertically, between adjacent wave structures. However, in certain embodiments, the wave structures may be sufficiently close and the unformed section there between may be substantially eliminated, as depicted in FIG. 4.

Each wave bank 330, 332, 334, 336 can include a formed section length, $L_{FS}$, measured along the circumference of the sidewall 304 from a beginning of the wave bank 330, 332, 334, 336 to an end of the wave bank 330, 332, 334, 336. If a particular wave bank 330, 332, 334, 336 includes any unformed section within the wave bank 330, 332, 334, 336 the length of the unformed section within the wave bank 330 can be subtracted from $L_{FS}$.

Each unformed section 340, 342, 344, 346 of the sidewall 304 of the body 302 of the tolerance ring 122 can include an unformed section length, $L_{US}$, measured along the circumference of the sidewall 304 from a beginning of the unformed section 340, 342, 344, 346 to an end of the unformed section 340, 342, 344, 346. The tolerance ring 122 can include a total formed section length, $L_{FST}$, that includes $L_{FS}$ for each wave bank 330, 332, 334, 336 and a total unformed section length, $L_{UST}$, that includes $L_{US}$ for each unformed section 340, 342, 344, 346 and the length of any unformed section within the each wave bank 330, 332, 334, 336. In a particular aspect, $L_{FST}$ can be $\leq L_{US}$. For example, $L_{FST}$ can be $\leq 95\% L_{US}$, such as $\leq 90\% L_{US}$, $\leq 85\% L_{US}$, $\leq 80\% L_{US}$, $\leq 75\% L_{US}$, or $\leq 50\% L_{US}$. In another aspect, $L_{FST}$ can be $\geq 5\% L_{US}$, such as $\geq 10\% L_{US}$, $\geq 15\% L_{US}$, or $\geq 20\% L_{US}$. Moreover, $L_{FST}$ can be within a range between, and including, any of the percentage of $L_{US}$ values described herein.

In a particular aspect, each wave bank 330, 332, 334, 336 can include at least two wave structures 350 grouped together, i.e., closely spaced along the circumference of the sidewall 304, and extending at least partially along a length of the body. In each embodiment described herein, two wave structures will always be located circumferentially closer to the gap 314 than the remaining wave structures. The two wave structures adjacent to the gap 314, i.e., the two wave structures closest to the gap 314 can include a first wave stiffness, $SW_1$. The other wave structures that are adjacent to unformed sections can include a second wave stiffness, $SW_2$. $SW_1$ can be $\geq 80\% SW_2$, such as $\geq 85\% SW_2$, $\geq 86\% SW_2$, $\geq 87\% SW_2$, $\geq 88\% SW_2$, $\geq 89\% SW_2$, or $\geq 90\% SW_2$. Further, $SW_1$ can be $\leq 99\% SW_2$, such as $\leq 98\% SW_2$, $\leq 97\% SW_2$, $\leq 96\% SW_2$, or $\leq 95\% SW_2$. In particular, $SW_1$ can be with a range between, and including, any of the percentage values of $SW_2$ described above.

The gap 314 can include a first width, $W_1$, measured along a circumference of the sidewall 304 of the body 302 of the tolerance ring 122 and each unformed section 340, 342, 344, 346 includes an second width, $W_2$, measured along the circumference of the sidewall 304 of the body 302 of the tolerance ring 122. In a particular aspect, $W_1$ can be $\geq 1\% W_2$, such as $\geq 5\% W_2$, $\geq 10\% W_2$, or $\geq 15\% W_2$. Moreover, $W_1$ can be $\leq 40\% W_2$, such as $W_1 \leq 35\% W_2$, or $W_1 \leq 30\% W_2$. In another aspect, $W_1$ can be within a range between, and including, any of the percentage of $W_2$ values disclosed above.

Each wave structure 350 can include a wave column 352 that includes at least two waves 322 vertically aligned with each other along the sidewall 304 of the body 302 of the tolerance ring 122, e.g., along a length of the tolerance ring 122.

As illustrated in FIG. 3, in a particular aspect, each wave column 352 the tolerance ring 122 can a first wave 354 near the top 306 of the sidewall 304 of the body 302 of the tolerance ring 122 and a second wave 356 near the bottom 308 of the sidewall 304 of the body 302 of the tolerance ring 122. In a particular aspect, the first wave 354 can be centered within the top half of the length of the tolerance ring 122. Moreover, the second wave 356 can be centered within the bottom half of the length of the tolerance ring 122. Each wave column 352 can also include a third wave 358 between the first wave 354 and the second wave 356. The third wave 358 can be centered along the length of the tolerance ring 122.

In one aspect, the first wave 354 can be the same size as the second wave 356, e.g., length, width, height (measured from the outer surface of the sidewall 304). In another aspect, the first wave 354, the second wave 356, and the third wave 358 are the same size, e.g., length, width, height (measured from the outer surface of the sidewall 304). In particular, the first wave 354 and the second wave 356 can have a first length, $L_1$, and the third wave 358 includes a second length, $L_2$, and $L_2 \leq L_1$. Specifically, $L_2$ can be $\leq 75\% L_1$, such as $L_2 \leq 70\% L_1$, $L_2 \leq 65\% L_1$, $L_2 \leq 60\% L_1$, $L_2 \leq 55\% L_1$, or $L_2 \leq 50\% L_1$. In another aspect, $L_2$ can be $\geq 25\% L_1$, such as $L_2 \geq 30\% L_1$, $L_2 \geq 35\% L_1$, or $L_2 \geq 40\% L_1$. In another aspect, $L_2$ can be within a range between, and including, any of the percentage values of $L_1$ disclosed above.

In a particular aspect, when the pivot assembly 104 is installed within the bore 116 of the actuator arm with the tolerance ring 122 disposed there between, the pivot 120 and the bore 116 can include a central axis that lies along, or nearly along, the central axis 320 of the tolerance ring 122. The tolerance ring 122 can provide an axial stiffness that can substantially resist rocking movement of the pivot 120 relative to the bore 116 and the actuator arm 102 in which the central axis of the pivot 120 rotates about an axis perpendicular to the central axis (a longitudinal axis) with respect to the central axis 320.

When left unconstrained, such rocking motion can cause the read/write heads 114 to contact a hard disk. This contact is undesired and can cause failure of a hard disk drive. In a particular aspect, the axial stiffness of the tolerance ring 122 does not vary too greatly when measured at various locations circumferentially around the tolerance ring 122.

For example, the axial stiffness of the tolerance ring 122 through the gap 314, $AS_G$, can be measured in a first direction that passes through the gap 314 and a center 360 of the tolerance ring 122. The axial stiffness of the tolerance ring 122 perpendicular to the gap 314, $AS_{PG}$, can be measured in a second direction perpendicular to the first direction. $AS_G$ can be $\geq 90\% AS_{PG}$, such as $\geq 91\% AS_{PG}$, $\geq 92\% AS_{PG}$, $\geq 93\% AS_{PG}$, $\geq 94\% AS_{PG}$, $\geq 95\% AS_{PG}$, $\geq 96\% AS_{PG}$, or $\geq 97\% AS_{PG}$. Further, $A_{SG}$ can be $\leq 100\% AS_{PG}$, $\leq 99\% AS_{PG}$, or $\leq 98\% AS_{PG}$. Moreover, $AS_G$ can be within a range between, and including, any of the percentage values of $AS_{PG}$ disclosed above.

Additionally, the resonant frequency of the tolerance ring 122 does not vary greatly when measured at various locations circumferentially the assembly in which the tolerance ring 122 is installed. For example, the resonant frequency of the tolerance ring 122 through the gap 314, $RF_G$, can be measured in a first direction that passes through the gap 314 and the center 360 of the tolerance ring 122. The resonant frequency of the tolerance ring 122 perpendicular to the gap 314, $RF_{PG}$, can be measured in a second direction perpendicular to the first direction. $RF_G$ can be ≥90% $RF_{PG}$, such as ≥91% $RF_{PG}$, ≥92% $RF_{PG}$, ≥93% $RF_{PG}$, ≥94% $RF_{PG}$, or ≥95% $RF_{PG}$. Further, $RF_G$ can be ≤100% $RF_{PG}$, ≤99% $RF_{PG}$, ≤98% $RF_{PG}$, ≤97% $RF_{PG}$, or ≤96% $RF_{PG}$. Moreover, $RF_G$ can be within a range between, and including, any of the percentage values of $RF_{PG}$ disclosed above.

While FIG. 2 and FIG. 3 indicate that the tolerance ring 122 can include four wave banks 330, 332, 334, 336, and four unformed sections 340, 342, 344, 346. In other aspects, the tolerance ring 122 can include two wave banks and two unformed sections, three wave banks and three unformed sections, five wave banks and five unformed sections, six wave banks and six unformed sections, etc. Further, while each wave bank 330, 332, 334, 336, includes three wave structures, in other aspects each wave bank 330, 332, 334, 336 can include one wave structure, two wave structures, four wave structures, five wave structures, six wave structures, etc.

Figure 5:
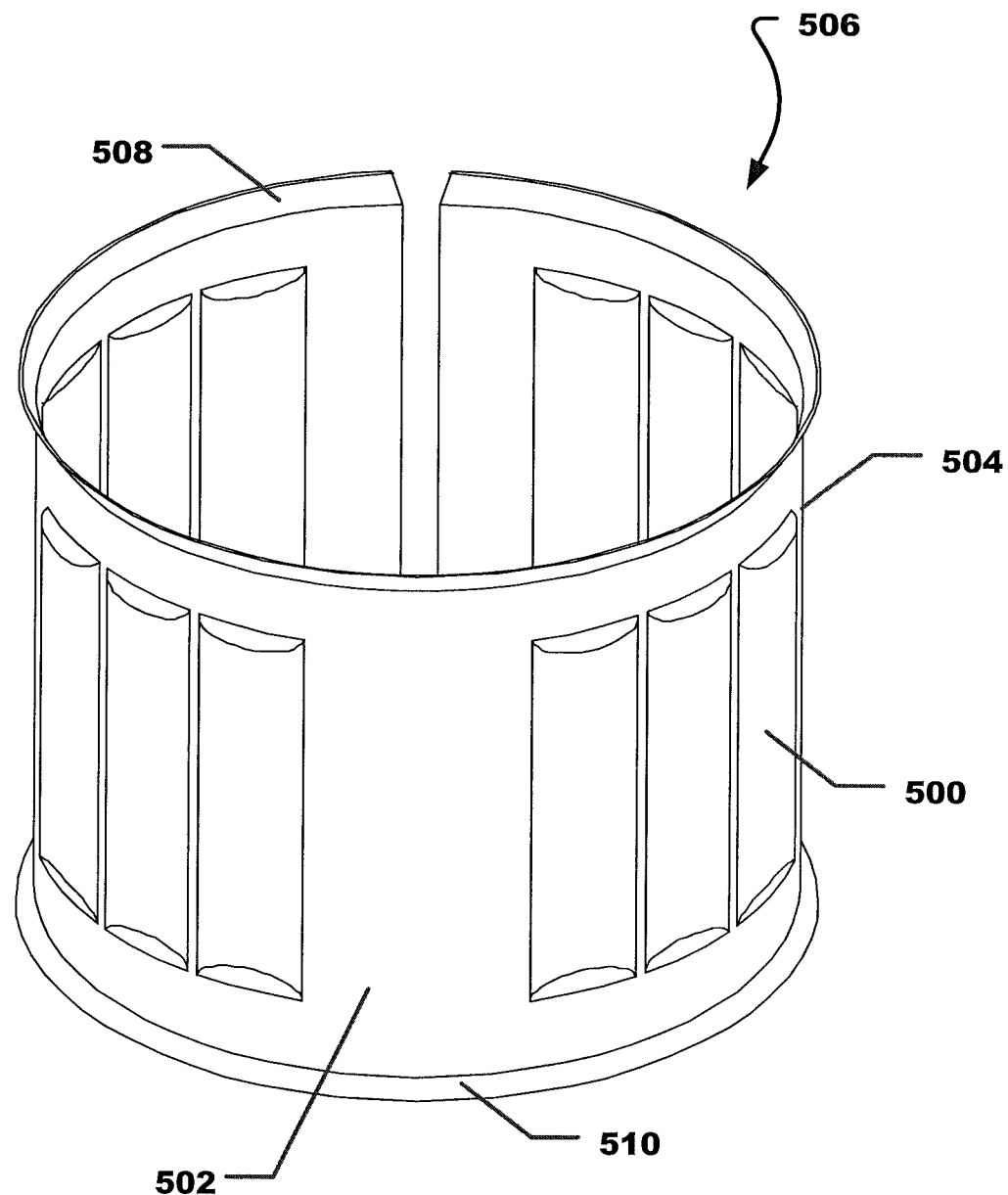
FIG. 5 includes a perspective view of a tolerance ring in accordance with another embodiment.

Referring briefly to FIG. 5, in another aspect, each wave structure can include a single elongated wave 500 extending longitudinally along a sidewall 502 of a body 504 of a tolerance ring 506 at least partially along a length of the tolerance ring 506 between an upper flange 508 and a lower flange 510. In this aspect, each elongated wave 500 can be centered along the length of the tolerance ring 500. Moreover, this aspect of the tolerance ring 500 can include one or more of the features or characteristics described herein with respect to the other tolerance rings disclosed herein.

Figure 6:
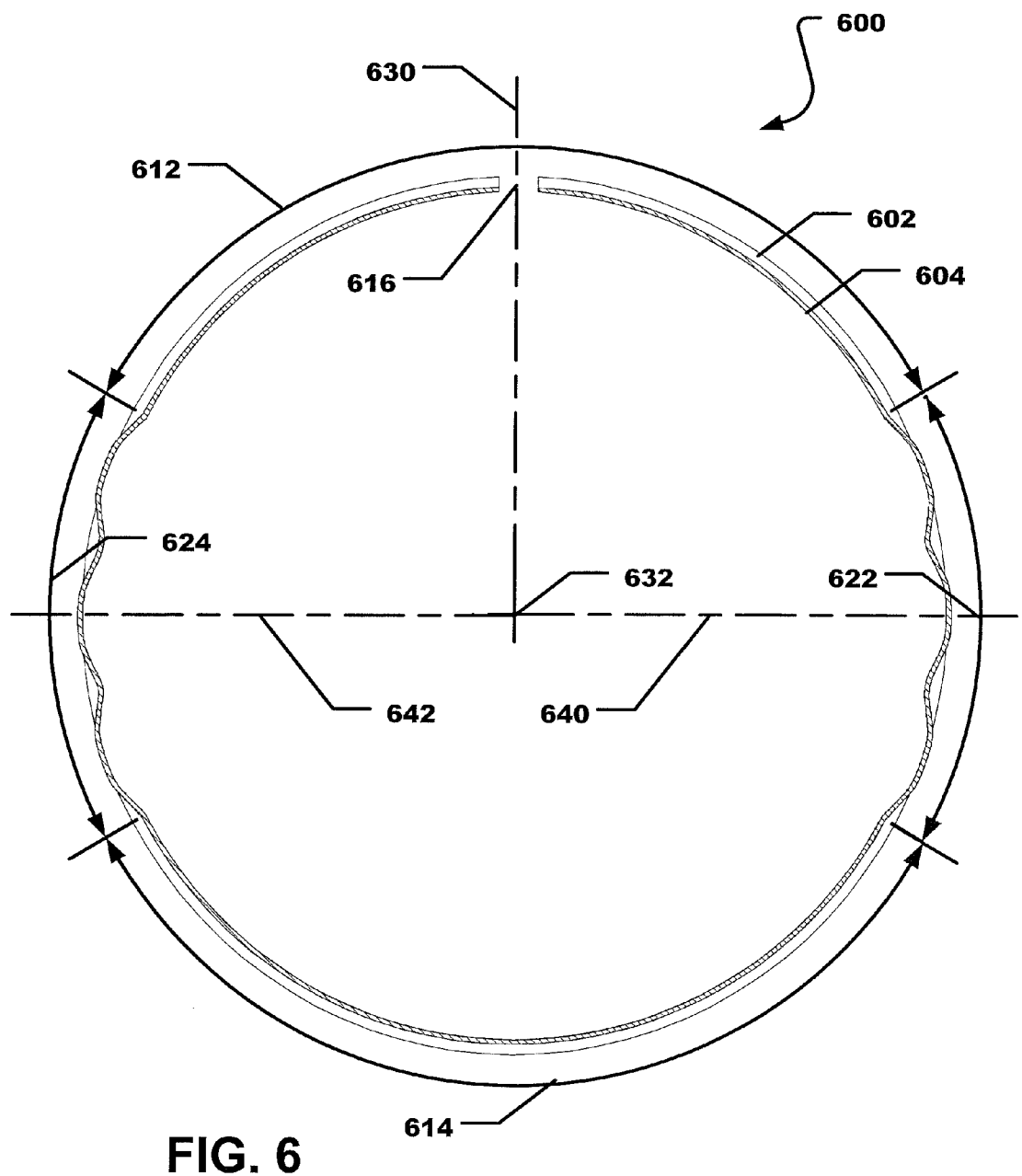
FIG. 6 includes a cross-sectional view of a tolerance ring in accordance with yet another embodiment.

Referring now to FIG. 6, another embodiment of a tolerance ring is illustrated and generally designated 600. FIG. 6 indicates that the tolerance ring 600 includes a body 602 having a sidewall 604. The sidewall 604 can include a first unformed section 612 and a second unformed section 614 opposite to the first unformed section 612. As indicated in FIG. 6, a gap 616 can be located in the first unformed section 612. The gap 616 can extend along an entire length of the tolerance ring 600 in order to establish a split in the tolerance ring 600. The second unformed section 614 opposite gap can include an unformed section angle, $A_{UOG}$, of ≥1°, such as ≥2°, ≥5°, ≥10°, ≥15°, ≥20°, ≥25°, ≥30°, or ≥35°. $A_{UOG}$ can be ≤120°, such as ≤90°, ≤75°, ≤60°, ≤45°, or ≤30°. In embodiments, $A_{UOG}$ can be 90°±3°, 90°±2°, 90°±1°, 90°±0.5°, 90°±0.1°, 60°±3°, 60°±2°, 60°±1°, 60°±0.5°, 60°±0.1°, 45°±3°, 45°±2°, 45°±1°, 45°±0.5°, 45°±0.1°, 30°±3°, 30°±2°, 30°±1°, 30°±0.5°, 30°±0.1°, 20°±3°, 20°±2°, 20°±1°, 20°±0.5°, or 20°±0.1°. In an embodiment, $A_{UOG}$ can range from 1° to 120°, such as from 15° to 120°, from 30° to 120°, or from 45° to 90°.

As illustrated in FIG. 6, the sidewall 604 of the body 602 of the tolerance ring 600 can include a first wave bank 622 formed in the sidewall 604. The first wave bank 622 can flank the first unformed section 612 with the gap 616 and the second unformed section 614. A second wave bank 624 can also flank the first unformed section 614 with the gap 616 and the second unformed section 614. The second wave bank 624 can be located opposite the first wave bank 622. As shown, the first unformed section 614 is located circumferentially between the first wave bank 622 and the second wave bank 624. Moreover, the second unformed section 614 is located circumferentially between the first wave bank 622 and the second wave bank 624. In a particular aspect, the wave banks 622, 624 are equally spaced around a circumference of the sidewall 604 of the body 602 of the tolerance ring 600 and the body 602 of the tolerance ring 600 is symmetrical about a center axis 630 that extends from a center 632 of the tolerance ring 600 and bisects the gap 616 in the first unformed section 612.

In a particular aspect, the gap 616 can be centered along the circumference of the body 602 at about 0°, such as 0°±3°, 0°±2°, 0°±1°, 0°±0.5°, or 0°±A first wave bank angle, $A_{W1}$, measured between the center axis 630 and a first wave bank axis 640 that extends from the center 632 of the tolerance ring 600 and bisects the first wave bank 622 can be about 90°, such as 90°±3°, 90°±2°, 90°±1°, 90°±0.5°, or 90°±0.1°. A second wave bank angle, $A_{W2}$, measured between the center axis 630 and a second wave bank axis 642 that extends from the center 632 of the tolerance ring 600 and bisects the second wave bank 624 can be about 270° such as 270°±3°, 270°±2°, 270°±1°, 270°±0.5°, or 270°±0.5°.

In other embodiments, as additional wave banks are added to the tolerance ring, each additional wave bank can be added such that it flanks the first unformed section with the gap. For example, a third wave bank can be located circumferentially between the second wave bank and the first wave bank. The third wave bank can flank the first unformed section with the gap opposite the first wave bank and a third unformed section can be located between the second wave bank and third wave bank. Next, a fourth wave bank can be located circumferentially between the third wave bank and the first wave bank. The fourth wave bank can flank the first unformed section with the gap opposite the first wave bank. A fifth wave bank can be located circumferentially between the fourth wave bank and the first wave bank. The fifth wave bank can flank the first unformed section with the gap opposite the first wave bank. A sixth wave bank can be located circumferentially between the fifth wave bank and the first wave bank. The sixth wave bank can flank the first unformed section with the gap opposite the first wave bank. This pattern can repeat for a seventh wave bank, an eighth wave bank, a ninth wave bank, a tenth wave bank, etc.

In an embodiment with three wave banks equally spaced around the circumference of the body and symmetric about a center axis, $A_{W1}$ can be about 60°, such as 60°±3°, 60°±2°, 60°±1°, 60°±0.5°, or 60°±0.1°; $A_{W2}$ can be about 180°, such as 180°±3°, 180°±2°, 180°±1°, 180°±0.5°, or 180°±0.1°; and a third wave bank angle, $A_{W3}$, measured between the center axis and a third wave bank axis extending from the center of the tolerance ring and bisecting the third wave bank can be about 300°, such as 300°±3°, 300°±2°, 300°±1°, 300°±0.5°, or 300°±0°.

In another embodiment with four wave banks equally spaced around the circumference of the body and symmetric about a center axis, $A_{W1}$ can be about 45°, such as 45°±3°, 45°±2°, 45°±1°, 45°±0.5°, or 45°±0.1°; $A_{W2}$ can be about 135°, such as 135°±3°, 135°±2°, 135°±1°, 135°±0.5°, or 135°±0.1°; $A_{W3}$ can be about 225°, such as 225°±3°, 225°±2°, 225°±1°, 225°±0.5°, or 225°±0.1°; and a fourth wave bank angle, $A_{W4}$, measured between the center axis and a fourth wave bank axis extending from the center of the tolerance ring and bisecting the fourth wave bank can be about 315°, such as 315°±3°, 315°±2°, 315°±1°, 315°±0.5°, or 315°±0.1°.

In still another embodiment with five wave banks equally spaced around the circumference of the body and symmetric about a center axis, $A_{W1}$ can be about 36°, such as 36°±3°, 36°±2°, 36°±1°, 36°±0.5°, or 36°±0.1°; $A_{W2}$ can be about 108°, such as 108°±3°, 108°±2°, 108°±1°, 108°±0.5°, or 108°±0.1°; $A_{W3}$ can be about 180°, such as 180°±3°, 180°±2°, 180°±1°, 180°±0.5°, or 180°±0.1°; $A_{W4}$ can be about 252°, such as 252°±3°, 252°±2°, 252°±1°, 252°±0.5°, or 252°±0.1°; and a fifth wave bank angle, $A_{W5}$, measured between the center axis and a fifth wave bank axis extending from the center of the tolerance ring and bisecting the fifth wave bank can be 324°, such as 324°±3°, 324°±2°, 324°±1°, 324°±0.5°, or 324°±0.1°.

In another embodiment with six wave banks equally spaced around the circumference of the body and symmetric about a center axis, $A_{W1}$ can be about 30°, such as 30°±3°, 30°±2°, 30°±1°, 30°±0.5°, or 30°±0.1°; $A_{W2}$ can be about ≤90°, such as 90°±3°, 90°±2°, 90°±1°, 90°±0.5°, or 90°±0.1°; $A_{W3}$ can be about 150°, such as 150°±3°, 150°±2°, 150°±1°, 150°±0.5°, or 150°±0.1°; $A_{W4}$ can be about 210°, such as 210°±3°, 210°±2°, 210°±1°, 210°±0.5°, or 210°±0.1°; and $A_{W5}$ can be about 270°, such as 270°±3°, 270°±2°, 270°±1°, 270°±0.5°, or 270°±0.1°, and a sixth wave bank angle, $A_{W6}$, measured between the center axis and a sixth wave bank axis extending from the center of the tolerance ring and bisecting the sixth wave bank can be about 330°, such as 330°±3°, 330°±2°, 330°±1°, 330°±0.5°, or 330°±0.1°.

In a particular aspect, the tolerance ring, e.g. any of the tolerance rings disclosed herein, can provide a concentricity, C, that is measured as a distance between a center of an inner component and a center of an outer component after assembly as described herein. C can be ≤50 μm, such as ≤45 μm, ≤40 μm, ≤35 μm, ≤30 μm, ≤25 μm, or ≤20 μm. Moreover, C can be ≥1 μm, such as C≥5 μm, C≥10 μm, or C≥15 μm. Further, C can be within a range between, and including, any of the values of C described herein.

In a particular aspect, a tolerance ring according to any of the aspects described herein can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel. Further, the tolerance ring can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967.

In another aspect, the stock material from which the tolerance ring can be formed can have a thickness, t, and t can be ≥0.085 mm, such as ≥0.087 mm, ≥0.090 mm, ≥0.095 mm, or ≥0.100 mm. In another aspect, t can be ≤0.115 mm, ≤0.113 mm, ≤0.110 mm, or ≤0.105 mm. Moreover, t can be within a range between, and including, any of the values of t disclosed above.

The tolerance ring according to any of the aspects described herein may have an overall outer diameter, OD, and OD can be ≥5 mm, such as ≥6 mm, ≥7 mm, ≥8 mm, ≥9 mm, or ≥10 mm. The OD can be ≤20 mm, such as ≤15 mm, ≤14 mm, ≤13 mm, ≤12 mm, or ≤10 mm. Further, OD can be within a range between and including any of the values of OD described herein.

In another aspect, the tolerance ring can have an overall length, L, and L can be ≤20 mm, such as ≤17 mm, ≤15 mm, ≤14 mm, or ≤13 mm. L can be ≥5 mm, ≥6 mm, ≥7 mm, ≥8 mm, ≥9 mm, or ≥10 mm. Moreover, L can be within a range between, and including, any of the values of L described above.

Additionally, after the stock material that is used to form any of the tolerance rings described herein is cut, stamped, and rolled to form the tolerance ring, the resulting tolerance ring is substantially free of any burrs. Specifically, no burrs are visible along any of the cut edges under a visual inspection of the tolerance ring under 10× magnification.

EXAMPLE

A tolerance ring is manufactured from X10CrNi18-8 stainless steel stock. The stainless steel stock has a thickness of 0.1 mm±0.013. Further, the stainless steel stock has a VPN of 400-450 and is passivated according to the ASTM standard A967. The formed tolerance ring includes four wave banks. Each wave bank includes two wave columns and each wave column includes three waves that are vertically aligned. The upper wave and the lower wave are approximately 1.66 mm wide and 3.0 mm tall. The middle wave is approximately 1.66 mm wide and 1.5 mm tall.

The tolerance ring has an overall wall thickness after installation of about 0.3 mm. Further, the tolerance ring has an overall free-state diameter of 11.5 mm and an overall length of 12.5 mm.

Figure 7:
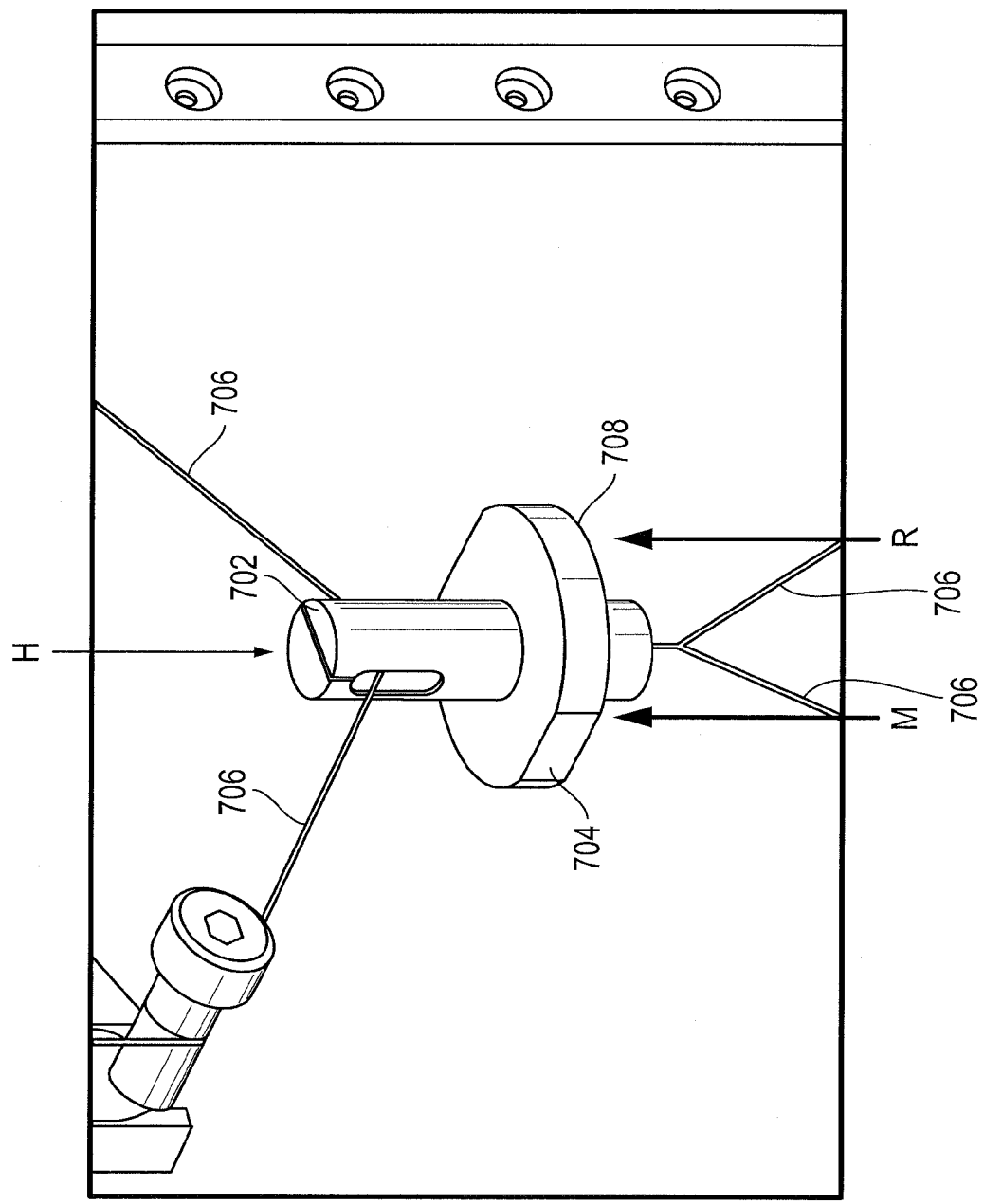
FIG. 7 includes a Hammer Test setup for testing on-axis axial stiffness.

FIG. 7 depicts a Hammer Test setup for on-axis axial stiffness testing. The tolerance ring is installed around a post 702 having an outer diameter of 11.135 mm and this assembly is installed within a ring 704 having a bore of approximately 11.722 mm. This assembly is suspended using fishing lines 706 and two lasers are placed perpendicular to a flat face of the ring 708 on the same side of the ring. The lasers are placed 180 degrees from each other. One laser is used as a reference laser and the other laser is used as a measurement laser. The post is tapped on the axis from the side opposite of the lasers as illustrated by the arrow labeled H. The lasers and the force transducer of the hammer are coupled to a microprocessor and provide inputs to the microprocessor.

Figure 8A:
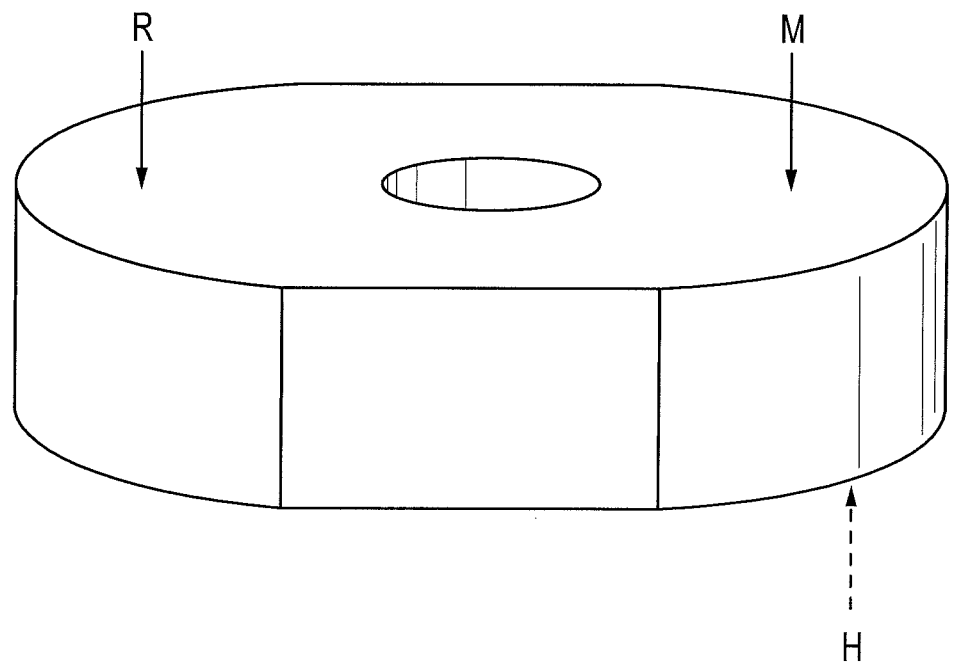
FIGS. 8A and 8B illustrate a Hammer Test for testing off-axial stiffness.
Figure 8B:
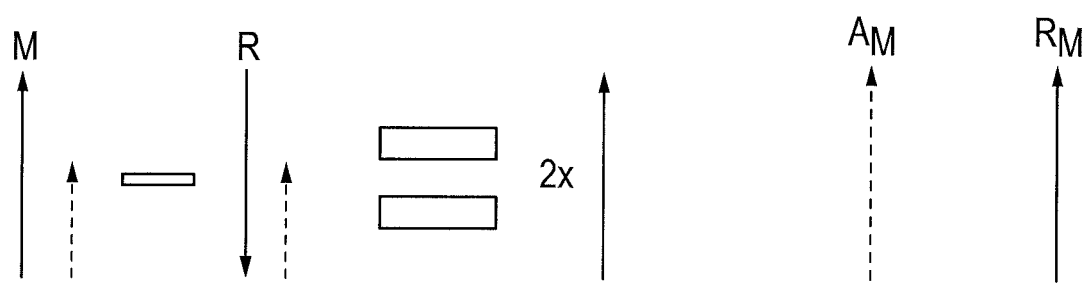

FIG. 8A illustrates the Hammer Test setup for off-axis axial stiffness testing. The tolerance ring is installed around a post having and within a ring as shown in FIG. 7 and suspended using fishing lines. As in FIG. 7, two lasers are placed perpendicular to a flat face of the ring on the same side of the ring. The lasers are placed 180 degrees from each other. One laser is used as a reference laser R and the other laser is used as a measurement laser M. The ring is tapped off-axis under the measurement laser as indicated by the arrow labeled H using a hammer that has a force transducer incorporated therein. The lasers and the force transducer of the hammer are coupled to a microprocessor and provide inputs to the microprocessor. FIG. 8B illustrates how the input is processed to compensate for the rocking mode $R_M$ and axial mode $A_M$ induced by the off-axis tap.

Figure 9A:
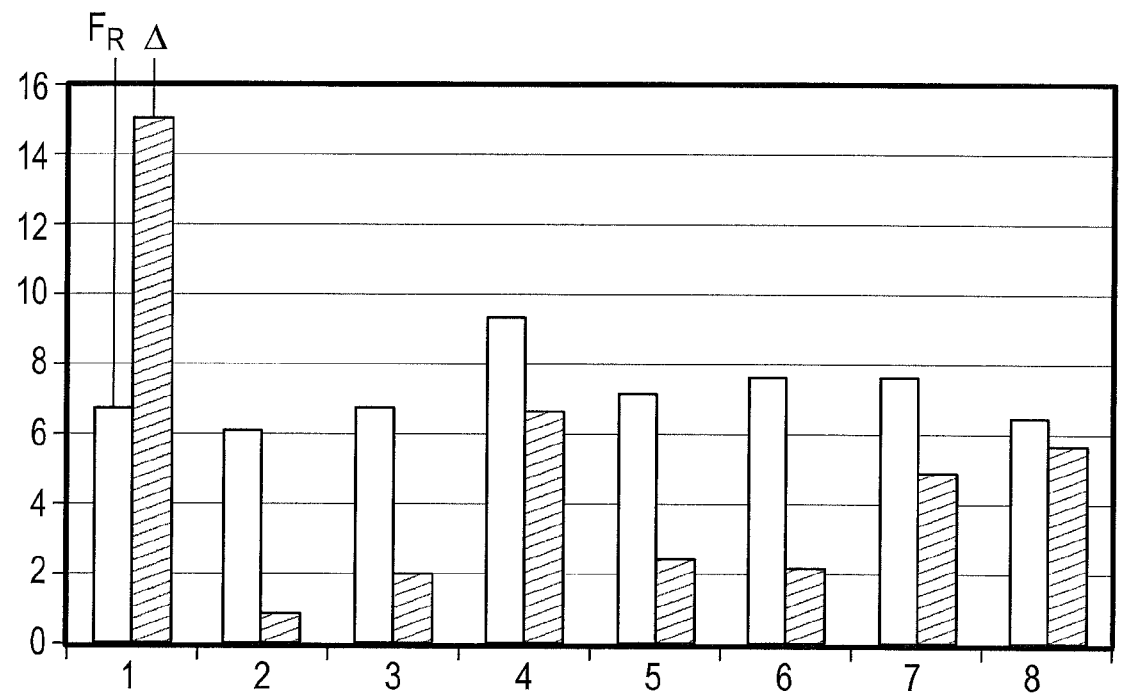
FIGS. 9A and 9B include the test results of on- and off-axis axial stiffness for various tolerance rings.
Figure 9B:
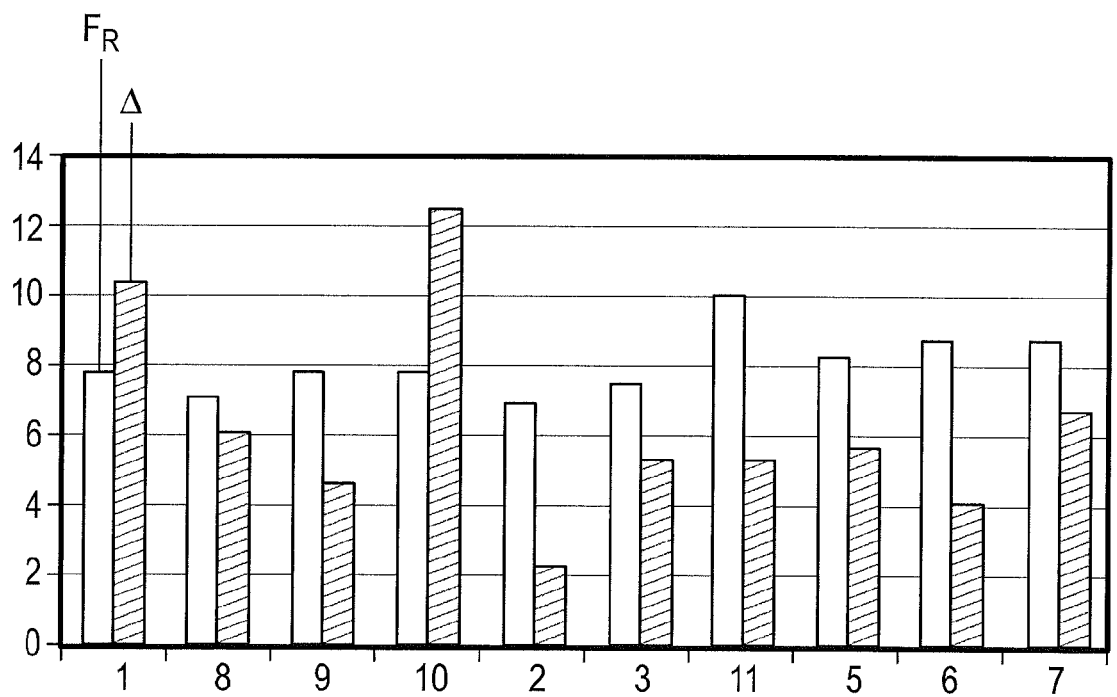

FIGS. 9A and 9B display the test results of on-axis and off-axis axial stiffness for various tolerance ring. In FIGS. 9A and 9B, the columns have the following designations. The $F_R$ provides the average resonant frequency in kHz of the ring; the Δ is the determined average percent difference around ring.

| | |
|---|---|
| 1 | Comparison A Tolerance Ring |
| 2 | eight wave quad ring |
| 3 | twelve wave quad ring |
| 4 | Double band Comp. ring |
| 5 | six wave pitch corrected |
| 6 | seven wave pitch corrected |
| 7 | eight wave pitch corrected |
| 8 | Comparison B Tolerance Ring |
| 9 | plannish (unformed) opposite gap |
| 10 | Center wave opposite gap |
| 11 | Ring with slits |

Ring 1 is a comparison ring being a 13 wave hard disc drive tolerance ring with three bands. Ring 2 is an eight wave ring in 4 groups. Ring 3 is a twelve waves tolerance ring in four groups. Ring 4 is similar to ring 1 but includes a double band. Ring 5 has six wave that are pitch corrected. Pitch corrected rings have waves distributed around the assembly with equal angular spacing. Rings 6 and 7 have a seven wave and eight wave pitch corrected arrangement, respectively. Ring 8 is a second comparison ring made from a new assembly batch having a 13 wave three band arrangement. Ring 9 has an unformed ("plannish") region opposite gap. Ring 10 has a centered wave opposite gap. Ring 11 is a 12 wave pitch corrected ring having slits located between waves. The slits have a length substantially to the length of the wave columns.

The radial stiffness of the ring in a dummy assembly is measured using a hammer test in 2 places; at the gap and at 90 degrees to the gap. The % difference is calculated between the average of 5 rings tested with 5 hits at each place. Since the tests were carried out with the same dummy masses, the resonant frequency is reported rather than the stiffness for ease of calculation, Equation 1.

The radial stiffness of the ring in a dummy assembly is measured using a hammer test in 2 places; at the gap and at 90 degrees to the gap. The % difference is calculated between the average of 5 rings tested with 5 hits at each place. Since the tests were carried out with the same dummy masses, the resonant frequency is reported rather than the stiffness for ease of calculation, Equation 1.

$$f = \frac{1}{2\pi}\sqrt{\frac{k}{m}}, \quad \text{(Eq. 1)}$$

wherein f is the resonant frequency, m is the effective mass, and k is the stiffness of the test piece.

Figure 10:
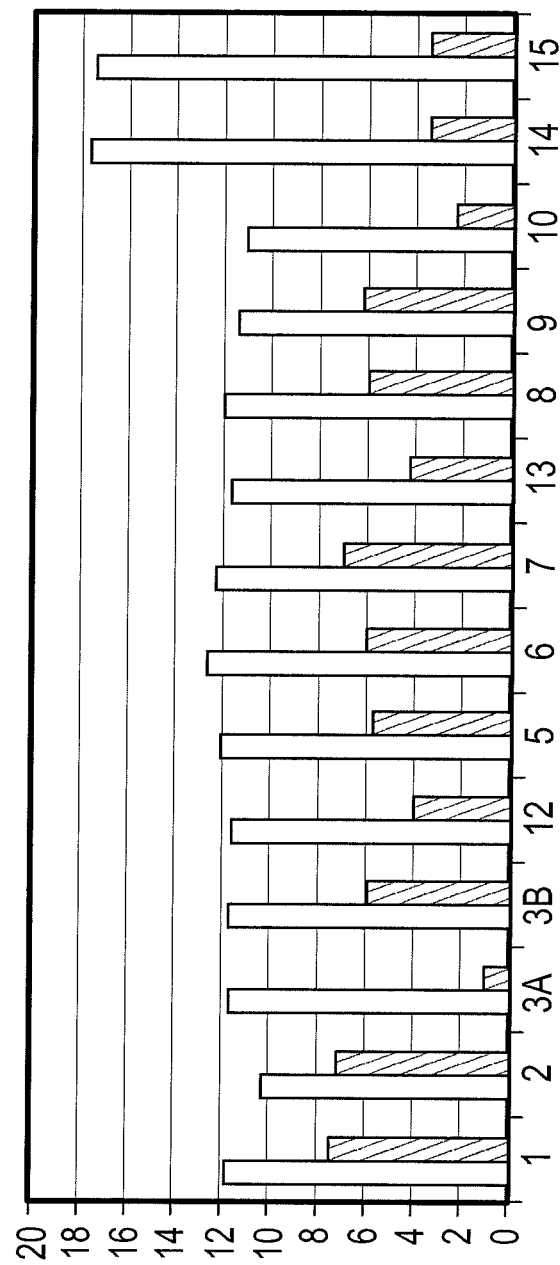
FIG. 10 includes the test results of radial stiffness for various tolerance rings.

FIG. 10 depicts the test results of radial stiffness testing for various tolerance ring. In FIG. 10, the columns have the same designations as in FIGS. 9A and 9B and as disclosed below. The $F_R$ provides the average resonant frequency in kHz of the ring; the A is the determined average percent difference around ring.

| | |
|---|---|
| 3A | 12 wave quad ring 40 lbf PAF |
| 3B | 12 wave quad ring 30 lbf PAF |
| 12 | Ring w/ holes |
| 13 | eleven wave pitch corrected |
| 14 | Ring housing variable |
| 15 | Ring with closed housing variable |

Ring 2A has a 40 lbf remaining assembly force. Ring 3B has 30 lbf remaining assembly force. Ring 12 is a 12 wave pitch corrected ring having holes between wave column, more specifically two holes between two waves. Ring 13 is an eleven wave pitch corrected. Ring 14 is a ring with housing variable, i.e. the ring can be squeezed to conform to a central bore. Ring 15 is a ring whit closed housing variable, i.e., the ring is smaller in diameter than its bore and can be stretched to conform to the bore.

For Peak assembly and initial slip testing, first the torque of a pivot is tested. The pivot is then assembled into an arm using the relevant tolerance ring and the peak assembly force (PAF) is recorded. The torque of the assembly is then tested and the difference between unassembled and assembled torque, or 'torque shift' is recorded. Next, the assembly is disassembled, and the initial slip is recorded and finally, the torque of the pivot is measured again. The pivot is re used until the post-assembled torque is considered high, or 5 times, whichever occurs first. The arm is re-used 5 times. These reusage policies are the result of previous investigation and shouldn't cause any problems, but it should be borne in mind that the pivot and arm are not virgin each time.

Figure 11:
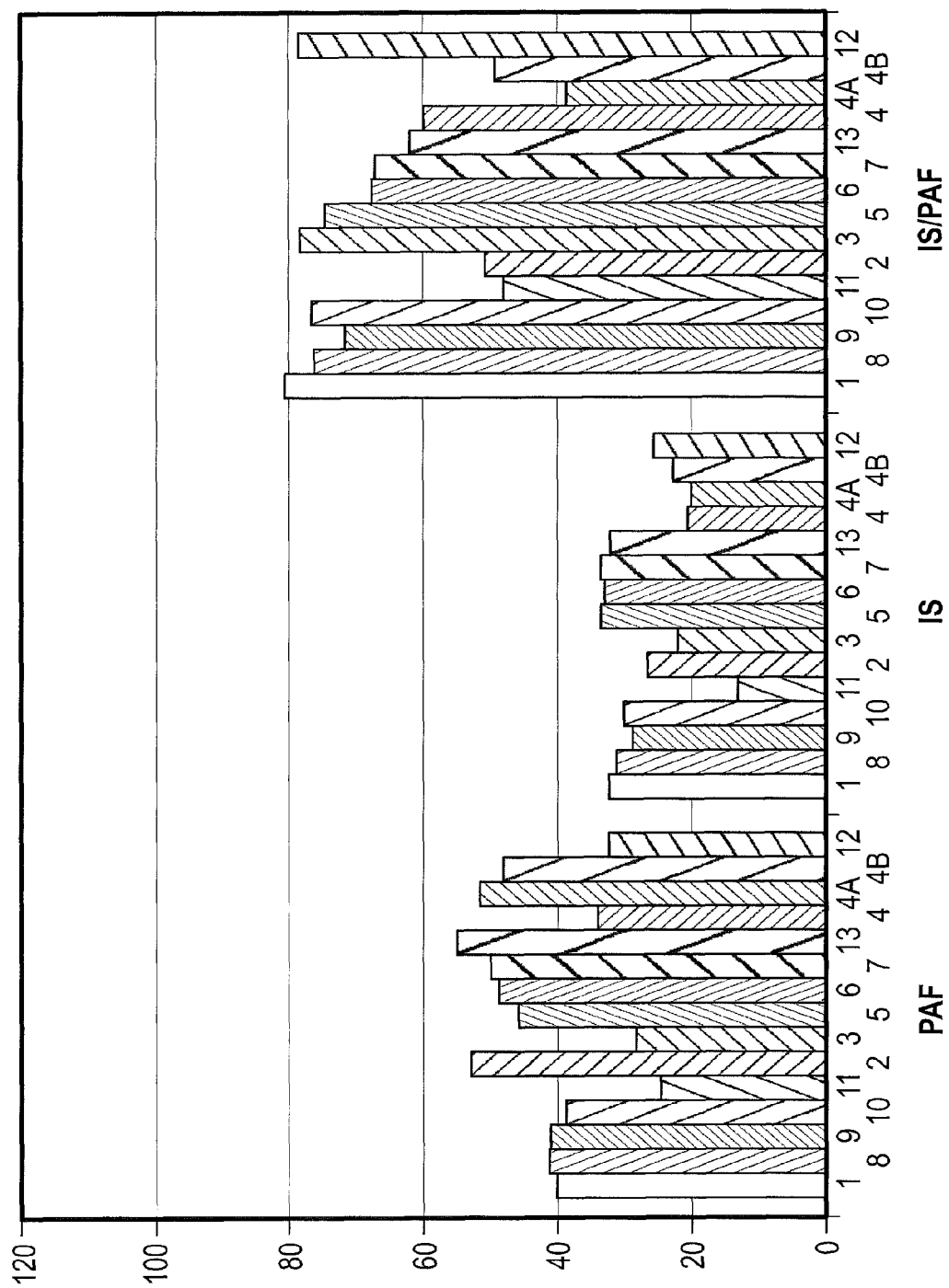
FIG. 11 includes test results for Peak Assembly Force (PAF), Initial Slip (IS), and ratio of IS/PAF for various tolerance rings.

FIG. 11 depicts the test results of PAF, IS, and IS/PAF testing for various tolerance ring. In FIG. 11, the columns have the same designations as in FIGS. 9A, 9B, and 10. PAF and IS are in lbf and IS/PAF is in %

The microprocessor includes software that calculates resonant frequencies from the inputs provided by the hammer and the lasers. The resonant frequency is directly related to the axial stiffness of the tolerance ring. The resonant frequency measured along an axis that bisects the gap and passes through a center of the assembly is about 6.65 kHz. The resonant frequency measured along an axis perpendicular to the first axis is about 6.8 kHz which is a difference of about 2.2%. As such, the axial stiffness through the gap, $AS_G$, is about 97.8% of the axial stiffness perpendicular to the gap, $AS_{PG}$.

The tolerance rings described herein provide a grouped wave arrangement equally spaced relative to a gap. The grouped wave arrangement, the relatively large unformed sections, or a combination thereof can provide a resonant frequency and stiffness that do not substantially vary circumferentially around the tolerance ring. As such, the tolerance ring can maintain the post in alignment within the bore and can substantially prevent any rocking of the post within the bore under normal operational loads in nearly any radial direction.

A skilled artisan can recognize that there may be others applications that can utilize a tolerance ring having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:
1. A tolerance ring comprising:
  a generally cylindrical body having a sidewall, wherein the sidewall includes:
    a first unformed section;
    a gap in the first unformed section, wherein the gap extends along an entire length of the body to establish a split in the body;
    a second unformed section opposite the first unformed section;
    a first wave bank flanking the first unformed section with the gap;

a second wave bank flanking the first unformed section with the gap;
a third wave bank located circumferentially between the first wave bank and the second wave bank; and
a third unformed section between the first wave bank and the third wave bank,
wherein the first, second, and third wave banks each comprises at least two wave structures spaced apart from one another by a distance that is less than a circumferential length of at least one of the first, second, and third unformed sections.

2. The tolerance ring of claim 1, wherein $A_{W1}$, measured between the center axis and a first wave bank axis extending from the center of the tolerance ring and bisecting the first wave bank, is 60°±3°, $A_{W2}$, measured between the center axis and a second wave bank axis extending from the center of the tolerance ring and bisecting the second wave bank, 180°±3°, and a third wave bank angle, $A_{W3}$, measured between the center axis and a third wave bank axis extending from the center of the tolerance ring and bisecting the third wave bank, is 300°±3°.

3. The tolerance ring of claim 1, further comprising a fourth wave bank located circumferentially between the third wave bank and the first wave bank.

4. The tolerance ring of claim 3, wherein $A_{W1}$ is 45°±3°, $A_2$ 135°±3°, $A_{W3}$ 225°±3°, and a fourth wave bank angle, $A_{W4}$, measured between the center axis and a fourth wave bank axis extending from the center of the tolerance ring and bisecting the fourth wave bank is 315°±3°.

5. The tolerance ring of claim 1, further comprising a fifth wave bank located circumferentially between the fourth wave bank and the first wave bank.

6. The tolerance ring of claim 5, wherein $A_{W1}$ is 36°±3°, $A_{W2}$ is 108°±3°, $A_{W3}$ is 180°±3°, $A_{W4}$ is 252°±3°, and a fifth wave bank angle, $A_{W5}$, measured between the center axis and a fifth wave bank axis extending from the center of the tolerance ring and bisecting the fifth wave bank is 324°±3°.

7. The tolerance ring of claim 1, wherein at least one of the at least two wave structures of the first wave bank comprises a wave column, and wherein the wave column includes a first wave and a second wave, the first and second waves being spaced apart from one another.

8. The tolerance ring of claim 1, wherein the first, second, and third wave banks are disposed along a same circumferential row as one another.

9. The tolerance ring of claim 1, wherein each of the first, second, and third wave banks include a same number of wave structures as one another.

10. The tolerance ring of claim 9, wherein wave structures adjacent to the gap comprise a first wave stiffness, $S_{W1}$, and wave structures adjacent to unformed sections comprise a second wave stiffness, $S_{W2}$, and wherein $S_{W1} \geq 80\% \, S_{W2}$.

11. The tolerance ring of claim 1, further comprising a total formed section length, $L_{FST}$, measured along a circumference of the sidewall and a total unformed section length, $L_{UST}$, measured along the circumference of the sidewall, wherein $L_{FST} \leq 95\% \, L_{US}$.

12. The tolerance ring of claim 11, wherein $L_{FST} \geq 5\% \, L_{US}$.

13. The tolerance ring of claim 1, wherein the wave banks are equally spaced around a circumference of the body of the tolerance ring.

14. An assembly comprising:
an outer component including a bore within the outer component;
an inner component disposed within the bore; and
a tolerance ring mounted on the inner component, the tolerance ring comprising:
a generally cylindrical body having a sidewall, wherein the sidewall includes:
a first unformed section;
a gap in the first unformed section, wherein the gap extends along an entire length of the body to establish a split in the body;
a second unformed section opposite the first unformed section;
a first wave bank flanking the first unformed section; and
a second wave bank flanking the first unformed section,
wherein the first and second wave banks each comprises at least two wave structures spaced apart from one another by a distance that is less than a circumferential length of at least one of the first and second unformed sections.

15. The assembly of claim 14, wherein the tolerance ring comprises an axial stiffness measured in a first direction bisecting the gap and passing through a center of the ring, $AS_G$, and an axial stiffness measured in a second direction perpendicular to the first direction, $AS_{PG}$, and wherein $AS_G \geq 90\% \, AS_{PG}$.

16. The assembly of claim 15, wherein $AS_G \leq 100\% \, AS_{PG}$.

17. The assembly of claim 14, wherein the tolerance ring comprises a concentricity, C, and C≤50 μm.

18. The assembly of claim 17, wherein C≥1 μm.

19. The assembly of claim 18, wherein the concentricity, C, comprises a distance between a center of the inner component and a center of the outer component.

20. A hard disk drive comprising:
an actuator arm formed with a bore;
a pivot assembly installed within the bore of the actuator the arm, the pivot assembly including a post and a tolerance ring around the post, wherein the tolerance ring includes:
a generally cylindrical body having a sidewall, wherein the sidewall includes:
a first unformed section;
a gap in the first unformed section, wherein the gap extends along an entire length of the body to establish a split in the body;
a second unformed section opposite the first unformed section;
a first wave bank flanking the first unformed section; and
a second wave bank flanking the first unformed section
wherein the first and second wave banks each comprises at least two wave structures spaced apart from one another by a distance that is less than a circumferential length of at least one of the first and second unformed sections.

* * * * *